United States Patent
Sun et al.

(10) Patent No.: US 11,163,533 B2
(45) Date of Patent: Nov. 2, 2021

(54) FLOATING POINT UNIT FOR EXPONENTIAL FUNCTION IMPLEMENTATION

(71) Applicant: INTERNATIONAL BUSINESS MACHINES CORPORATION, Armonk, NY (US)

(72) Inventors: Xiao Sun, Pleasantville, NY (US); Ankur Agrawal, Chappaqua, NY (US); Kailash Gopalakrishnan, New York, NY (US); Silvia Melitta Mueller, Altdorf (DE); Kerstin Claudia Schelm, Stuttgart (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 137 days.

(21) Appl. No.: 16/515,174

(22) Filed: Jul. 18, 2019

(65) Prior Publication Data

US 2021/0019116 A1   Jan. 21, 2021

(51) Int. Cl.
*G06F 7/556* (2006.01)
*G06F 7/523* (2006.01)
(Continued)

(52) U.S. Cl.
CPC .............. *G06F 7/556* (2013.01); *G06F 7/50* (2013.01); *G06F 7/523* (2013.01); *G06N 3/08* (2013.01); *G06F 2207/5561* (2013.01)

(58) Field of Classification Search
CPC ............ G06F 7/556; G06F 2207/5561; G06N 3/0481
See application file for complete search history.

(56) References Cited

U.S. PATENT DOCUMENTS 6,772,389 B2   8/2004   Kim et al.
7,912,883 B2 *  3/2011   Hussain .................. G06F 7/556
                                                              708/277
(Continued)

FOREIGN PATENT DOCUMENTS

WO      200079306 A1   12/2000
WO      2005119920 A2  12/2005

OTHER PUBLICATIONS

Chapter 6.4: Transformations of Exponential and Logarithmic Functions, pp. 317-324. Retrieved from https://static.bigideasmath.com/protected/content/pe/hs/sections/alg2_pe_06_04.pdf.
(Continued)

*Primary Examiner* — Emily E Larocque
(74) *Attorney, Agent, or Firm* — Cantor Colburn LLP; Joseph Petrokaitis

(57) ABSTRACT

A computer-implemented method for performing an exponential calculation using only two fully-pipelined instructions in a floating point unit that includes. The method includes computing an intermediate value y' by multiplying an input operand with a predetermined constant value. The input operand is received in floating point representation. The method further includes computing an exponential result for the input operand by executing a fused instruction. The fused instructions includes converting the intermediate value y' to an integer representation z represented by v most significant bits (MSB), and w least significant bits (LSB). The fused instruction further includes determining exponent bits of the exponential result based on the v MSB from the integer representation z. The method further includes determining mantissa bits of the exponential result according to a piece-wise linear mapping function using a predetermined number of segments based on the w LSB from the integer representation z.

20 Claims, 6 Drawing Sheets

(51) Int. Cl.
   *G06F 7/50* (2006.01)
   *G06N 3/08* (2006.01)

(56) References Cited

U.S. PATENT DOCUMENTS

| | | |
|---|---|---|
| 8,914,801 B2 | 12/2014 | Anand et al. |
| 9,977,116 B2 | 5/2018 | Lerner |
| 2004/0267853 A1* | 12/2004 | Fossum .................. G06F 7/556 |
| | | 708/495 |
| 2005/0119920 A1 | 6/2005 | Dent |
| 2019/0042922 A1* | 2/2019 | Pillai .................... G06N 3/0454 |
| 2020/0293315 A1* | 9/2020 | Mangnall ................ G06F 7/483 |

OTHER PUBLICATIONS

Exponential Functions. Retrieved from: https://www.math.utah.edu/~wortman/1050-text-ef.pdf. 11 pages.

Goldberg et al., "Comparative Analysis of Selection Schemes Used in Genetic Algorithms". University of Illinois at Urbana-Champaign, Department of General Engineering. Retrieved from: https://www.math.utah.edu/-wertman/1050-text-ef.pdf. 27 pages.

Schraudolph, N. "A Fast, Compact Approximation of the Exponential Function," Communicted by Michael Hines, accepted Jul. 2, 1998, IDSIA, Lugano, Switzerland, 10 pages.

\* cited by examiner

FLOATING POINT UNIT FOR EXPONENTIAL FUNCTION IMPLEMENTATION

BACKGROUND

The present invention generally relates to computer technology, and more specifically, to a floating point unit that provides an improved exponent calculation that has at least the state-of-the-art accuracy while reducing the computation time and energy cost significantly.

Neural network computations and other machine learning algorithms typically use the exponential (e.g. exp( ) or exponentiation) function for performing one or more operations that require nonlinear function. For example, among other uses, activation functions and probability distributions used in neural network models use the exponential function. For example, machine learning computations such as deep neural network (DNN), convolutional neural network (CNN), and recurrent neural network (RNN) rely heavily on exponential calculations in their softmax, sigmoid, hyperbolic functions etc. Consequently, much of the time in neural simulations is actually spent on exponential calculations.

SUMMARY

According to one or more embodiments of the present invention, a computer-implemented method is described for computing, using a floating point unit that includes an estimation block, exponential calculation using only two fully-pipelined instructions. The computer-implemented method includes computing an intermediate value y' by multiplying an input operand with a predetermined constant value. The input operand is received in floating point representation. The method further includes computing an exponential result for the input operand by executing a fused instruction. The fused instructions includes converting the intermediate value y' to an integer representation z represented by v most significant bits (MSB), and w least significant bits (LSB). The fused instruction further includes determining exponent bits of the exponential result based on the v MSB from the integer representation z. The method further includes determining mantissa bits of the exponential result according to a piece-wise linear mapping function using a predetermined number of segments based on the w LSB from the integer representation z.

According to one or more embodiments of the present invention, a system includes a processor, and a floating point unit that is communicatively coupled to the processor. The floating point unit includes an estimation block that performs a method for fast exponential calculation using only two fully-pipelined instructions. The method includes computing an intermediate value y' by multiplying an input operand with a predetermined constant value. The input operand is received in floating point representation. The method further includes computing an exponential result for the input operand by executing a fused instruction. The fused instructions includes converting the intermediate value y' to an integer representation z represented by v most significant bits (MSB), and w least significant bits (LSB). The fused instruction further includes determining exponent bits of the exponential result based on the v MSB from the integer representation z. The method further includes determining mantissa bits of the exponential result according to a piece-wise linear mapping function using a predetermined number of segments based on the w LSB from the integer representation z.

According to one or more embodiments of the present invention, a system includes a neural network, and a floating point unit coupled with the neural network. The floating point unit computes one or more mathematical operations instructed by the neural network. The mathematical operations include an exponential function, wherein the exponential function is computed by performing a method for fast exponential calculation using only two fully-pipelined instructions. The method includes computing an intermediate value y' by multiplying an input operand with a predetermined constant value. The input operand is received in floating point representation. The method further includes computing an exponential result for the input operand by executing a fused instruction. The fused instructions includes converting the intermediate value y' to an integer representation z represented by v most significant bits (MSB), and w least significant bits (LSB). The fused instruction further includes determining exponent bits of the exponential result based on the v MSB from the integer representation z. The method further includes determining mantissa bits of the exponential result according to a piece-wise linear mapping function using a predetermined number of segments based on the w LSB from the integer representation z.

The above-described features can also be provided at least by a system, a computer program product, and a machine, among other types of implementations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
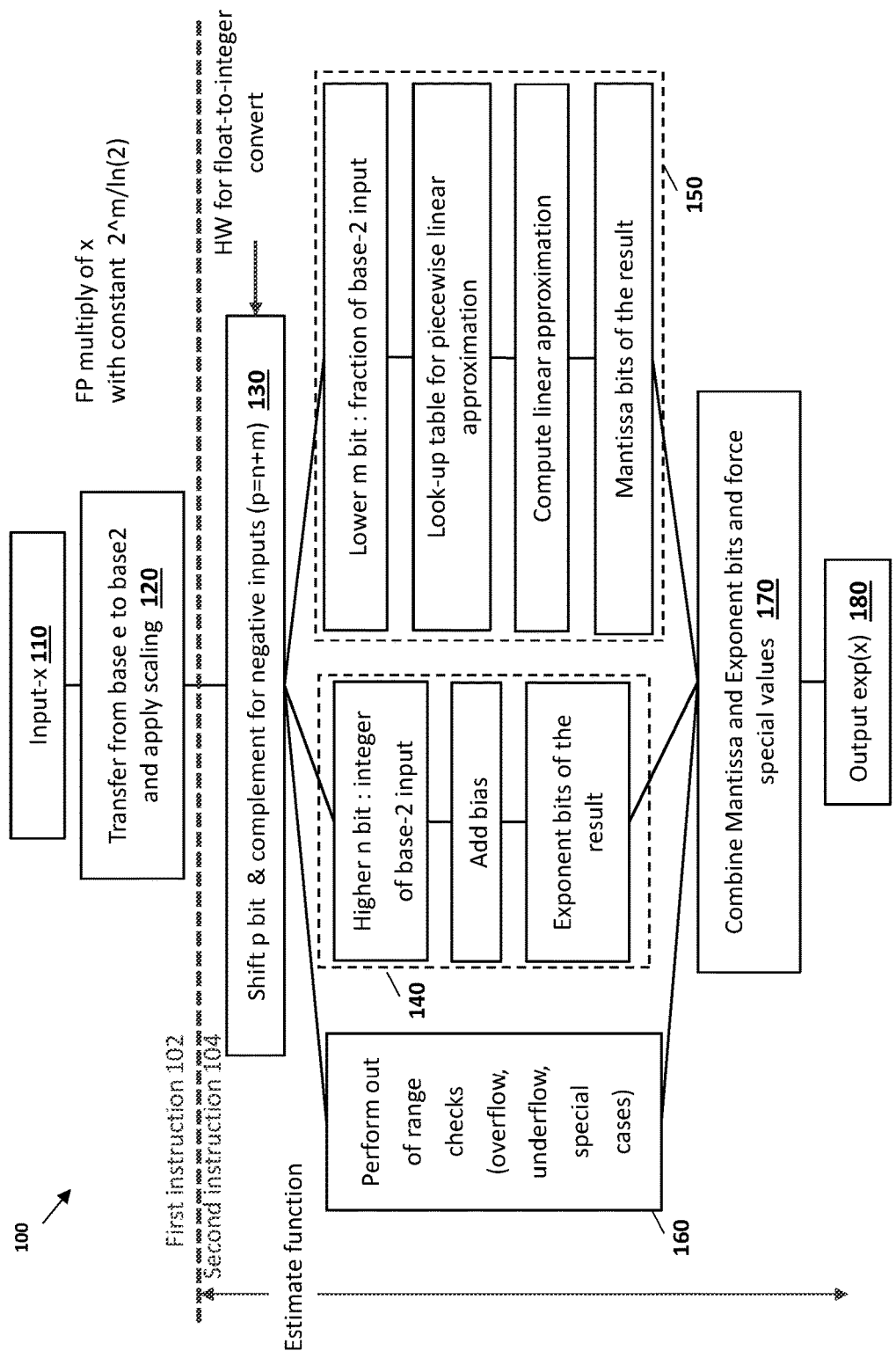
FIG. 1 depicts a flowchart of a method for computing an exponential function according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

As noted earlier, various computer algorithms, such as machine learning computations (e.g. DNN, CNN, and RNN) rely heavily on exponential calculation (exp( ) in their softmax, sigmoid, hyperbolic functions etc. For example, the sigmoid function includes the following calculations:

$$sig(t) \frac{1}{1+e^{-t}} = \frac{e^t}{1+e^t} = \frac{1}{2} \cdot \left(1 + \tanh\frac{t}{2}\right)$$

The softmax function includes the following calculations:

$$\sigma(z)_j = \frac{e^{z_j}}{\sum_{k=1}^{K} e^{z_k}}$$

Similarly, various other non-linear computations typically use the exponential calculation and such non-linear computations are used in several popular algorithms. However, typical computers are integer machines and are capable of representing real numbers only by using complex codes. The most popular code for representing real numbers is called the IEEE Floating-Point Standard. Most floating-point numbers a computer can represent are just approximations. One of the challenges in programming with floating-point values is ensuring that the approximations lead to reasonable results. Small discrepancies in the approximations can lead to the final results being substantially inaccurate. Further, because mathematics with floating-point numbers is computing resource intensive, microprocessors in a computer typically include a chip, called a floating point unit (FPU) that is specialized for performing floating-point arithmetic. FPUs are also called math coprocessors and numeric coprocessors. The FPU can be part of the microprocessor chip itself, or a separate chip coupled with the microprocessor. One of the common functions that the FPU estimates upon instruction is the exponential calculation function.

Typically, the exponential calculation is invoked by using a math library, and using a function call (e.g. exp(a)) to compute the exponential using the provided parameters. The exponential calculation functions provided by typical computer math libraries are highly accurate but are computationally intensive and slow. Typical exponential function implementation is done by Look-up instructions+Taylor expansion+instructions to assemble the result. It requires a sequence of computer instructions (e.g. 14 instructions), to achieve a suitable accuracy using the existing techniques and existing floating point unit hardware. Consequently, neural network calculations typically spend a substantial amount of time executing instructions for performing the exponential calculation. Along with the amount of time required, energy cost, and computing resources being busy executing these instructions pose a technical problem.

In the case of machine learning algorithms, an approximation of the exponential function, can be adequate, such as for typical neural computation purposes. This is particularly valid in cases where the input format to the machine learning algorithms is in low precision, such as 16 bit. Performing such an approximation can save time. In recognition of this, many existing software packages approximate the exponential function with a lookup table, typically with linear interpolation.

Turning now to an overview of aspects of the invention, embodiments of the invention address the above-described shortcomings in the prior art by providing computing systems configured to facilitate calculating the exponential function using a hardware implementation, which provides an accurate calculation of the exponential function that can reach an accuracy for standard machine learning jobs such as ImageNet classifications while reducing the computation time and energy cost significantly. Using an FPU according to one or more embodiments of the present invention provides at least the same level of accuracy as baseline high-precision implementations at the task level. For example, in case of a neural network for classifying images, a number/proportion of images being labeled correctly using the FPU has to match (or exceed) a baseline implementation (without using the FPU according to one or more embodiments of the present invention). Further, implementations according to one or more embodiments of the present invention are customized for machine learning jobs in various precisions and can be verified on hardware emulation platform. Accordingly, one or more embodiments of the present invention address the technical challenges described herein and provide a practical application to improve the performance of a computer, particularly a floating point unit (or other arithmetic unit) by providing a hardware implementation of an exponential function calculation. Other advantages provided by one or more embodiments of the present invention will be evident to a person skilled in the art based on the description herein.

FIG. 1 depicts a flowchart of a method 100 for computing an exponential function according to one or more embodiments of the present invention. The method 100 includes executing two instructions to compute the exponential function. A first instruction 102 is to multiply the input with a constant. The input is a floating point input. Further, a second instruction 104 includes a float-to-integer compute followed by a piecewise linear function computation (addition of 3 terms), where only one lookup is used to access a constant as one of the 3 terms in the sum.

The method 100 includes receiving an input value X for which to compute the exponential, at 110. The input X is received in floating-point representation, i.e., represented as fx. Further, the method 100 includes transfer from base e to base 2 and applying a predetermined scaling, at 120. This operation can be expressed as:

$$e^x = 2^y \rightarrow y = x/\ln 2 \rightarrow y' = x*2^m/\ln 2$$

Here, m is a predetermined constant. According to one or more embodiments of the present invention m is preconfigured to 11. To compute y' in the above expression using a floating point unit, y' can be computed by floating point (FP) multiply instruction with operands x and $2048/\ln(2)$. For performing the above calculation, the value $FA = \text{float}(2^{11}/\ln(2))$, where m=11, can be precomputed, and y' can be computed by performing a FP multiply instruction y'=FA*fx. The resulting y' is a floating point value.

The method 100 further includes performing, with the y' value as input, an operation to shift p bit and complement for negative inputs, at 130. This operation converts y' into an integer z, which is a p-bit integer (i.e. includes p bits). Further, the p bits of z are separated into two portions, a first portion, v, comprising of most-significant bits of z, and a second portion, w, comprising of m least-significant bits of z. It should be noted that the scaling of the input operand using $2^m$ (at 120) facilitates the integer z to include the m fractional bits of intermediate value y, represented by the quantity w. Further, to obtain the exponential of the input operand x, we need to compute $2^y$ as shown by the calculation below:

$$y' = (v*2^m + w) \rightarrow y = v + \frac{w}{2^m}$$

$$2^y = 2^{\frac{(v*2^m+w)}{2^m}} = 2^v * 2^{(0.w)}$$

Here, $2^v$ can be used as the exponent value of the floating point number that represents the result of the exponential calculation, and $2^{(0.w)}$ represents a value in range [1, 2), i.e., like the mantissa 1.f of the floating-point number. Note that 'm' is the same value used in the prior operations, for example m=11.

It should be noted that floating-point numbers in IEEE 754 format include three fields: a sign bit, a biased exponent, and a fraction. The following example illustrates the meaning of each. The decimal number $0.15625_{10}$ represented in binary is $0.00101_2$ (that is, $\frac{1}{8} + \frac{1}{32}$). (Subscripts indicate the number base.) Analogous to scientific notation, where numbers are written to have a single non-zero digit to the left of the decimal point, this number can be rewritten so that it has a single 1 bit to the left of the "binary point". By multiplying with the appropriate power of 2 to compensate for shifting the bits left by three positions: $0.00101_2 = 1.01_2 \times 2^{-3}$.

In this example, the fraction is $0.01_2$ and the exponent is $-3$. Accordingly, the three fields in the IEEE 754 representation of this number are:

1. sign=0, because the number is positive (1 indicates negative.);
2. biased exponent=$-3$+the "bias". In single precision, the bias is 127, so in this example the biased exponent is 124; in double precision, the bias is 1023, so the biased exponent in this example is 1020; and
3. fraction=0.01000 . . . . $_2$.

The bias is added to the exponent to get the final result according to the IEEE 754 standard. It should be noted that although IEEE 754 standard is described herein, in one or more embodiments of the present invention, a different standard can be used without going beyond the scope of the technical features described herein. In 16-bit floating point representation, the format is assumed to have an implicit lead bit with value 1 unless the exponent field is stored with all zeros. Thus only 9 bits of the significand appear in the memory format but the total precision is 10 bits. In IEEE 754 parlance, there are 9 bits of significand, but there are 10 bits of significand precision ($\log 10(2^{10})$ 3.010 decimal digits, or 4 digits±slightly less than 5 units in the last place). It is understood that while the description of the one or more embodiments of the present invention use the 16 bit precision format, other floating point representations can be used in other embodiments of the present invention.

Referring to the flowchart of FIG. 1, the method 100 further includes computing the exponent bits of the result by computing $2^v$, at 140. The MSB n bits are used to compute the integer of base-2 input and the bias is added to the result to obtain the exponent bits.

Further, to compute the fraction of base-2 input the method 100 includes computing an approximate 1.f via a piecewise linear function: $mi*(0.w)+ci$ with i being a predetermined number of segments, for example 6 segments. In one or more embodiments of the present invention the approximation function is customized such that the multiplication ($mi*(0.w)$) can be replaced by a 2-way add. This saves computational resources because a multiplication operation is more computationally intensive than an addition operation.

Figure 2:
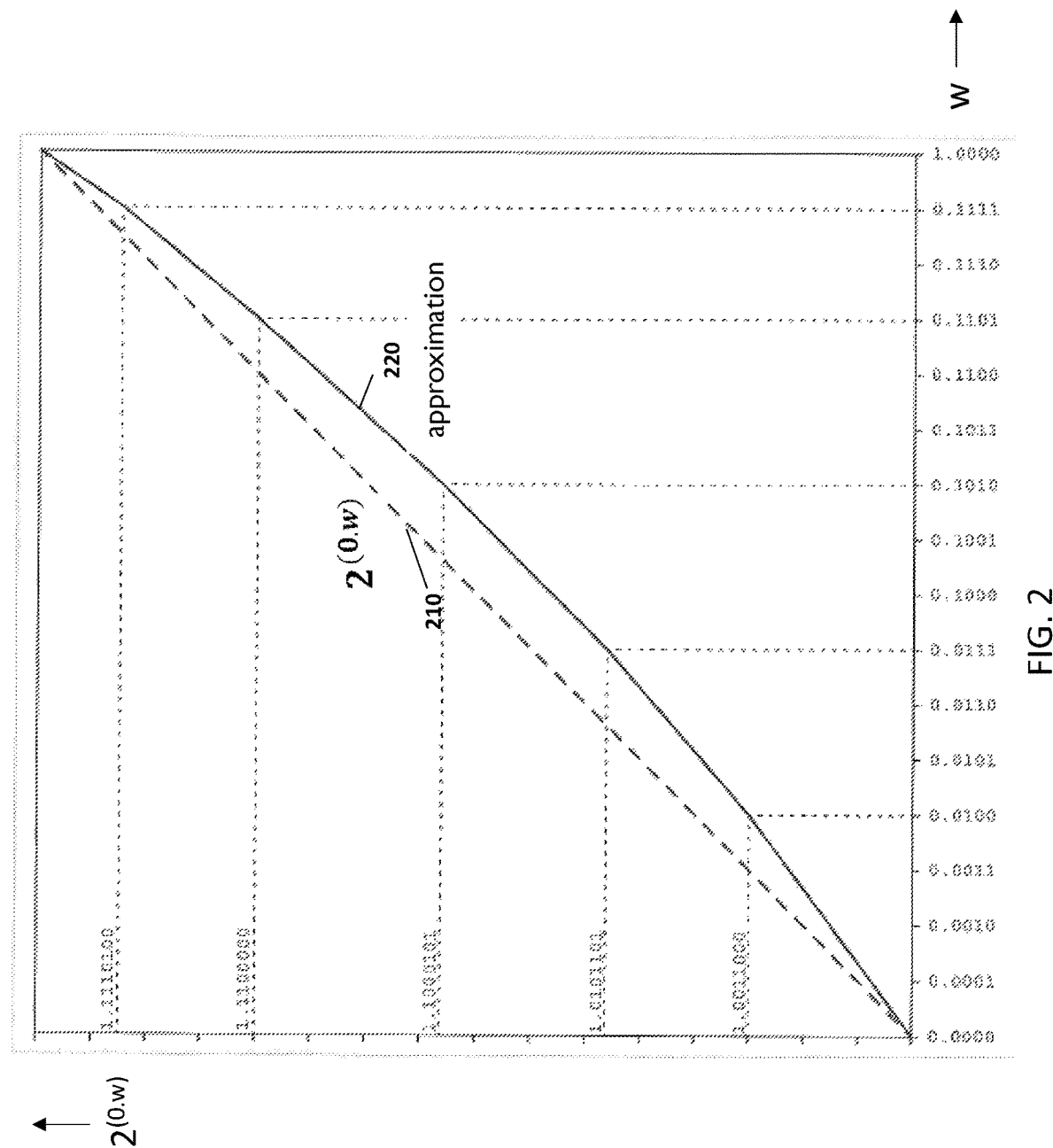
FIG. 2 depicts a visualization of the approximation of the fraction of base-2 input according to one or more embodiments of the present invention.

FIG. 2 depicts a visualization of the approximation of the fraction of base-2 input according to one or more embodiments of the present invention. As depicted, the range of possible fraction values based on the 4 MSBs of the fraction, in case of m=11, is divided into predetermined number of segments, in this case 6. An approximation can be looked-up in a table including values for the depicted plot 200. As can be seen, the approximations on curve 220 may not be exactly equal to the $2^{(0.w)}$ values on the curve 210. However, the approximation is sufficient for using the resulting exponential value in machine learning algorithms, and other types of applications. The end points are accurate, making the function contiguous even across binades. A binade is a set of binary floating-point values that all have the same sign and exponent. The binade property is a member of the same binade as this value, but with a unit significand. For example, consider that x has a value of 21.5, which is stored as 1.34375*2^4, where ^ is exponentiation. Therefore, x.binade is equal to 1.0*2^4, or 16.0.

In the method 100, a look-up table is generated for piecewise linear approximation using the predetermined number of segments and a linear approximation is computed for the fraction bits to obtain a mantissa bit of the exponential result, at 150. In existing solutions, for each binade/exponent value, the fraction is obtained by a single linear function: A*f+B. In one or more embodiments of the present invention a piece wise linear approximation: i.e., for each binade, the fraction equation is composed of multiple linear segments, where a predetermined number of linear segments (such as 6 in FIG. 2) are used. The piece-wise linear approximation provides a better approximation of the fraction part.

Additionally, in the method 100, out of range checks are performed on the y' value to determine if an overflow, an underflow, or any special cases have occurred, such as the input being 0, positive/negative infinity, not-a-number (NaN), or any other special case as provided by the floating point standard such as the IEEE 754. In such a case, a corresponding result can be force fed into the output of the exponential as specified by the floating point standard, at 160. The exponential function result in a floating point unit only works when the input is within a predetermined range because of the range of floating point numbers that can be represented by the floating point unit. Accordingly, the method includes checking for out-of-range scenarios and providing a mathematically acceptable value when such cases are detected. For example, when the input x is a very large negative number, then mathematically, the result of exp(x) gets very close to zero. Accordingly, the method 100 delivers a zero when the input value is detected to be below a predetermined value. In the same way, when the input value is in any other such specific range, the predetermined output of the exponential function is provided.

The results from the special case determination, the exponent determination, and the mantissa bit determination are combined to determine the final output of the exponential value for the received input x, at 170. The result is subsequently output, at 180.

Figure 3:
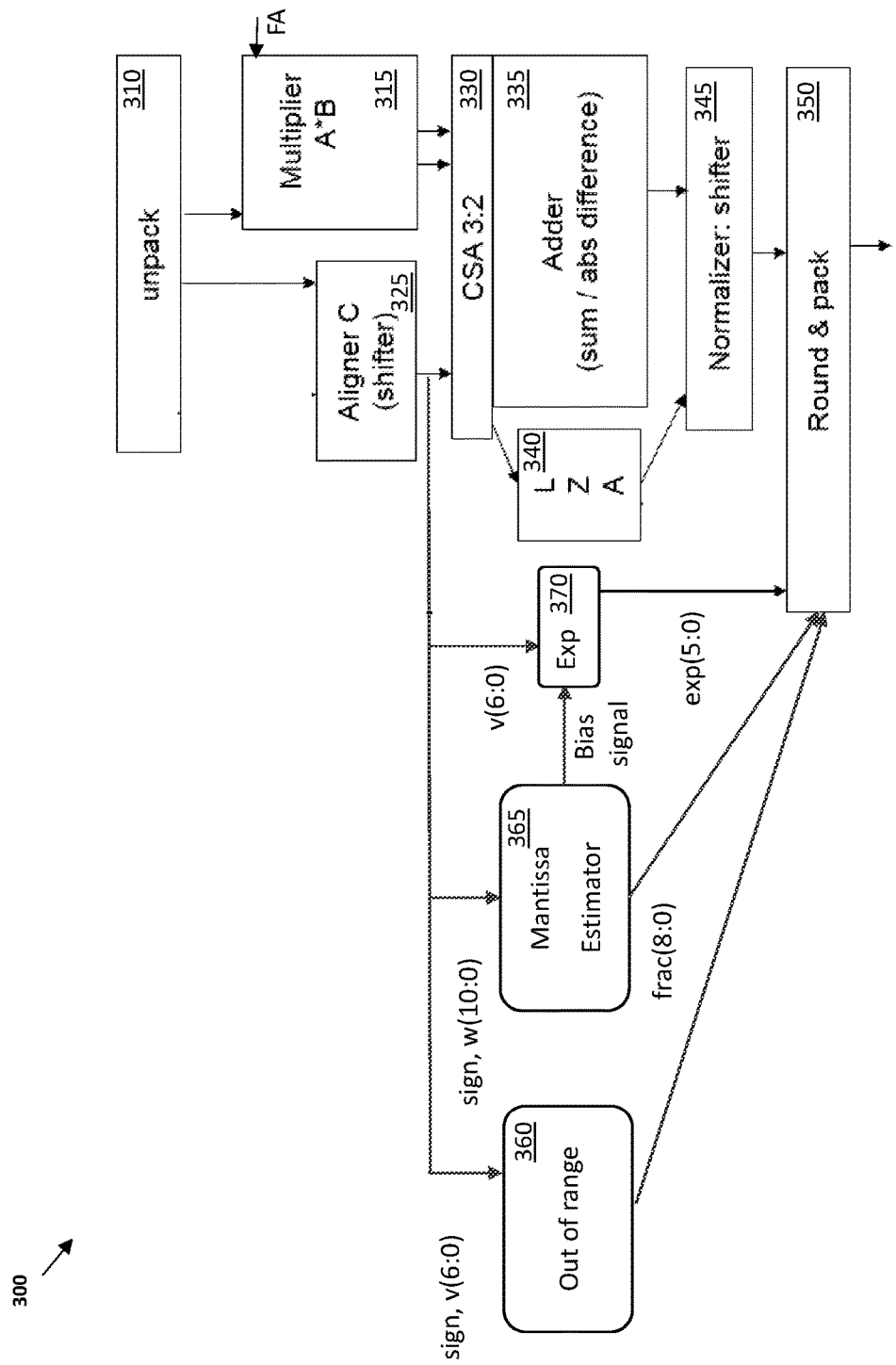
FIG. 3 depicts a block diagram of a floating point unit for performing exponential implementation according to one or more embodiments of the present invention.

FIG. 3 depicts a block diagram of a floating point unit for performing exponential implementation according to one or more embodiments of the present invention. The floating point unit 300 can be part of a central processing unit, or a coprocessor in a computing device. The floating point unit 300 can include modules such as a carry save adder (CSA) 330, an adder 335, a leading zero anticipator (LZA) 340, a normalizer 345, and various others. These blocks facilitate floating point arithmetic such as addition, multiplication etc. after shifting the bits in the operands to align the bits according to the exponent/weights.

The floating point unit 300 includes an unpack module 310 that unpacks the input floating point value (fx) provided to the exponential function. The unpacking determines the sign, the biased exponent portion, and the fraction portion in the input operand(s), which are typically accessed from a register. Further, the floating point unit 300 includes a multiplier 315, a bit shifter 325, and an exponent bit shifter 320 that together are used to scale the input (fx) by computing y'=FA*fx as described herein (FIG. 1, 120). The multiplication and shifting is performed in parallel in one or more embodiments of the present invention.

It should be noted that the scaling is done in floating point representation (not integer) followed by the float-to-integer convert by pre-computing FA=float(2^m/ln(2)), and computing the scaling Y=FA*fx still in floating point representation. Performing the scaling in floating point representation has less rounding error than performing a float-to-integer first and then the scaling.

Further, the product from the multiplier 315 can include a carry bit and a product bit-vector that are both fed into the CSA 330. The CSA 330 further receives the output from the aligner 325. The two outputs of the CSA 330 is passed through a regular adder 335. To represent the output of the adder 335 in the floating point representation, the normalizer 345 shifts the bits to represent the result in the sign, exponent, mantissa format. For example, the normalizer 345 shifts the bits to remove the leading zeros, which can be counted by the LZA 340. The LZA 340 can operate in parallel to the adder 335.

The round and pack module 350 receives a floating point result from one or more operations performed by the floating point unit 300. In one or more examples the floating point result can have more bits than those in the input operands to the floating point unit 300.

In the case where the floating point unit receives an instruction to compute the exponential of an input operand (fx), the aligner 325 computes the z value, which as described earlier, where z=v w, where v represents the n MSB of y' and w represents m LSB of y', where y'=FA*fx. In the depicted blocks of FIG. 3, for explanation purposes, w is shown to be the lowest 11 bits of z, and v is the remaining bits of z. It should be noted that although the example scenario described herein uses the above mentioned number of bits for w and v (and other predetermined values), in other embodiments of the invention, the values can be different.

The w bits are input into an estimator module 365 that computes the mantissa portion of the exponential result, which in this case is an 9 bit fractional value of the exponential result. The estimator module 365 also receives the sign bit of the input operand.

The v bits are input into an out of range module 360 that determines whether the input operand is with the predetermined range for which specific exponential result is to be output. The out of range module 360 also receives the sign bit of the input operand. The out of range module 360 detects if the input operand is in specific predetermined ranges, and if so, provides the corresponding predetermined output value as the result of the exponential value. The output is forwarded to a round and pack module 350.

The v bits are also received by an exponent logic module 370, which computes the exponent bits of the exponential result. The exponent bits are forwarded to the round and pack module 350.

Accordingly, the round and pack module 350 receives the fraction bits (mantissa) from the estimator module 365, the exponent bits from the exponent multiplexer 370, and a result from the out of range module 360. If the out of range module 360 indicates that the input operand is a special case, the exponent bits and the mantissa bits are ignored, and the special predetermined result from the out of range module 360 is output as the exponential result. Else, the round and pack module 350 provides the exponential result in the floating point representation using the computed exponent and mantissa bits.

The exponent logic module 370 also receives a bias signal from the estimator module 365. The bias signal indicates whether to add a bias value or a bias+1 value to when generating the exponential result from the mantissa and exponent bits. The bias+1 value is added if the computation results in a next binade, else the bias value is to be added.

Figure 4:
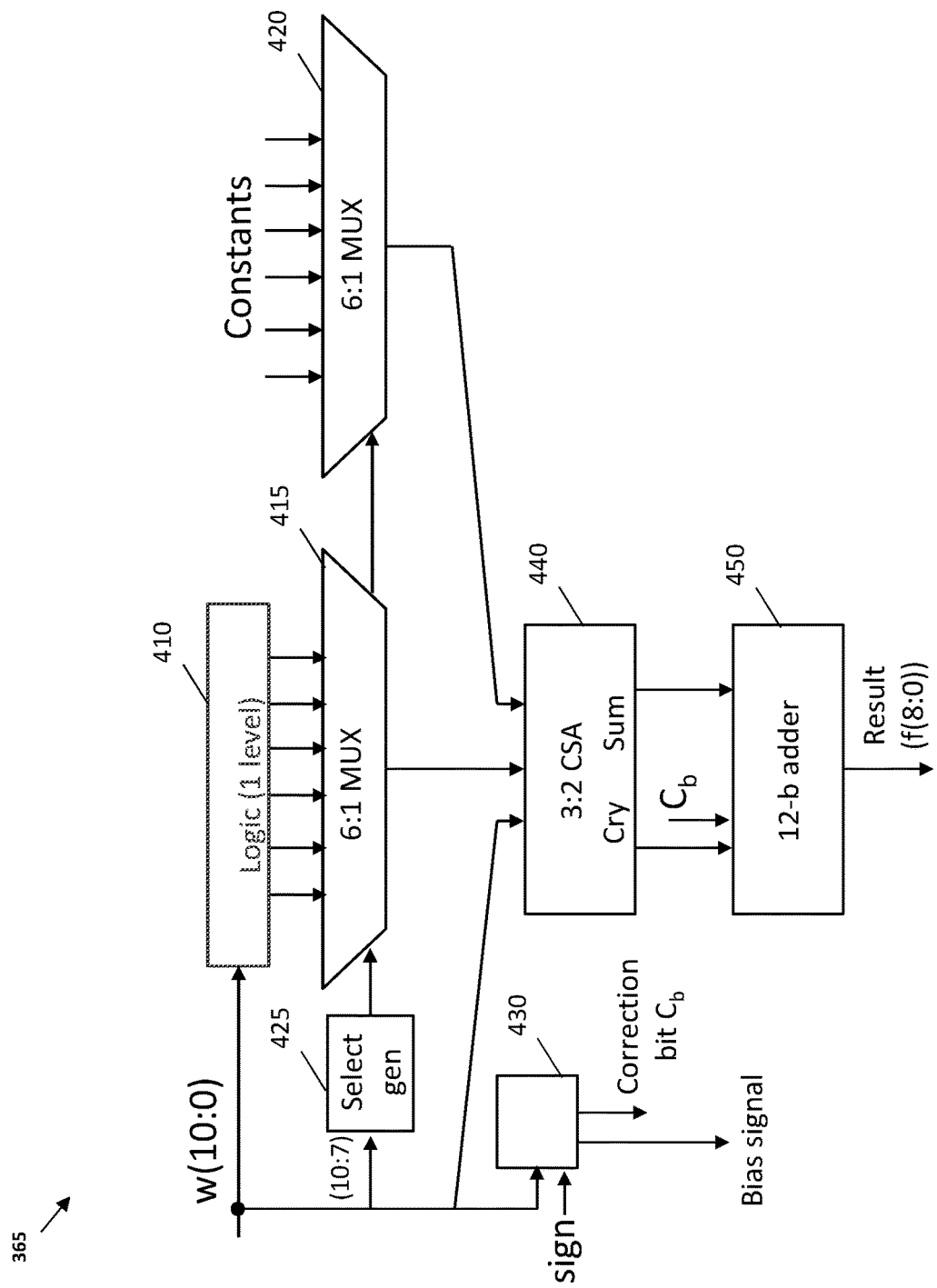
FIG. 4 depicts a block diagram of an estimator module that computes an estimated exponential of the input value according to one or more embodiments of the present invention.

FIG. 4 depicts a block diagram of an estimator module that computes an estimated exponential of the input value according to one or more embodiments of the present invention. The estimator module 365 facilitates computing an approximate 1.f via a piecewise linear function: mi* (0.w)+ci with i being a predetermined number of segments. For performing this, the estimator module 365 receives the w bits of z. As noted earlier, in this example scenario w includes m=11 bits and consider further that the piece wise linear mapping is performed using i=6 segments. Accordingly, the block diagram shows 6:1 multiplexers being used. The multiplexers will be different in other embodiments where different number of segments are used for the piece wise linear mapping. The value of c is a predetermined constant.

The estimator module 365 computes the fraction part of the exponential result, which is forwarded to the round and pack module 350. The estimator module 365 also forwards the bias signal that indicates the bias value that is to be combined with the fraction part to compute the final exponential result.

The estimator module 365 includes a segment selection logic block 410 which provides a selection signal to a multiplexer 415 to select one of the predetermined (i=6) segments. The multiplexer 415 outputs an approximate fraction value according to the selected segment to a CSA 440. Further, the CSA 440 receives the w bits so as to compute the term mi*(0.w) from the above expression using the output of the multiplexer 415.

The selection signal for the segment is also provided to a multiplexer 420. The multiplexer 420 computes the ci term from the expression using the predetermined constant and the selected segment. The output of the multiplexer 420 is also provided to the CSA 440.

Further, the estimator module 365 includes bias signal computer 430, which receives the sign bit and the w bits. The bias signal computer 430 determines if a binade boundary is crossed for the input operand. If so, the bias signal is set to indicate that a bias+1 value is to be added when computing the final exponential result. Otherwise, the bias signal indicates adding only bias when computing the exponential result. It should be noted that the output of the adder 450 is a 12 bit value, to represent the mantissa bits of the exponential result. However, to meet the 16 bit floating point representation, the output of the exponential result has to be in the format with 1 sign bit, 6 exponent bits, and 9 mantissa bits. Accordingly, the output of the estimator module 365 is to be a 9 bit fraction for the mantissa bits. Therefore, the estimator module 365 uses a rounding, such as a round nearest up (RNU) rounding mode. This impacts how the bias signal is computed, because the rounding can cause the exponent to increment. For example, following case can occur: if the number is negative and close enough to the upper boundary of the binade interval, and if the mantissa of the approximated result is close to 2.0 and due to rounding gets rounded to 2.0. In such cases, the exponent has to be incremented. Accordingly, in one or more embodiments of the present invention, the bias signal is computed as: bias signal=and_reduce(w(10:1)).

The bias signal computer 430 also computes a correction bit ($C_b$). The mathematical representation of the calculations performed by the estimator module 365 can be summarized as follows:

$$frac(10:0) =$$

$$w(10:0) + \delta(I) + \begin{cases} 11\overline{w(10:2)} + 00000000001 & \text{if } [0000, 0001]/1 \\ 111\overline{w(10:3)} + 11111000001 & \text{if } [0100, 0110]/2 \\ 11101010000 & \text{if } [0111, 1001]/3 \\ 111w(10:3) + 11110110001 & \text{if } [10101, 1100]/4 \\ 11w(10:2) + 11111100001 & \text{if } [1101, 1110]/5 \\ 1w(10:1) + 00000000001 & \text{if } [1111]/6 \end{cases}$$

The correction bit $\delta(I)$ is set to 1 if:

$$\delta(I) = 1 \text{ if } \begin{cases} I1 \text{ neg} \wedge (w(1:0) \neq 11) \\ I2 \text{ neg} \wedge (w(2:0) \neq 111) \\ I3 \wedge neg \\ I4 \text{ neg} \wedge (w(2:0) = 111) \\ I5 \text{ neg} \wedge (w(1:0) = 11) \\ I6 \text{ neg} \wedge (w(0) = 1) \end{cases}$$

Here, neg=1 when sign bit input to the bias signal computer 430 is 1.

The correction bit, and the output of the CSA 440, which includes a carry bit and the sum bit vector are added by an adder 450 to generate the mantissa of the exponential result. The estimator module 365 outputs the mantissa bits (in this case 9 bits) and the bias signal.

Figure 5:
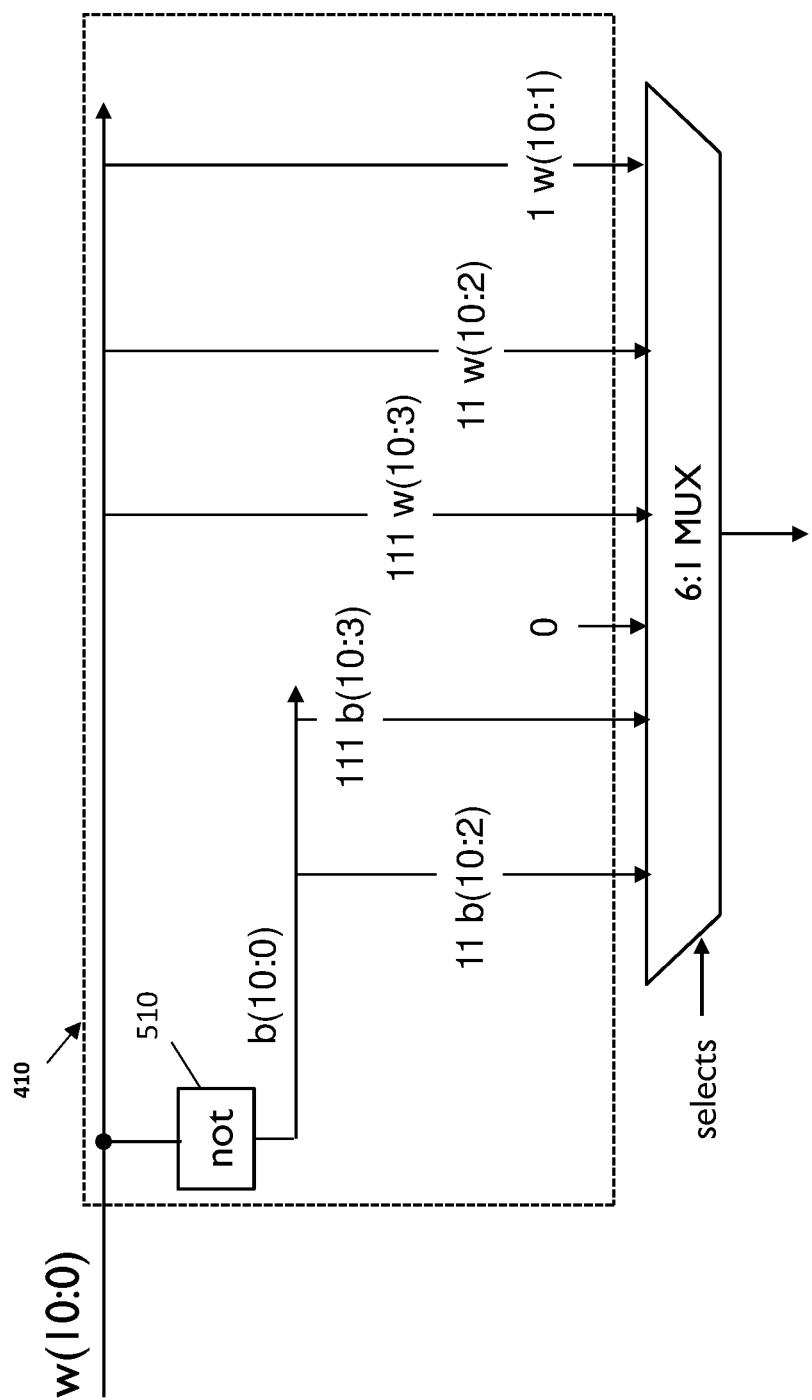
FIG. 5 depicts a block diagram of a segment selection logic block that determines which piece wise mapping segment to select according to one or more embodiments of the present invention.

FIG. 5 depicts a block diagram of a segment selection logic block that determines which piece wise mapping segment to select according to one or more embodiments of the present invention. The segment selection logic block 410 includes a NOT gate 510 that outputs b=not (w). Based on the combination of the bits in b and w, one of the corresponding predetermined segments is selected as an approximation of the fraction part. For example, 11 b (10:2) indicates that if the first two leading bits in the bits (10-2) of b are 11, the first segment value is output, in the example depicted in FIG. 5. The segments (e.g. FIG. 2) are accordingly mapped to the w bits and selected based on the w bits.

Figure 6:
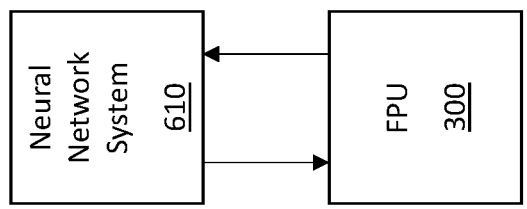
FIG. 6 depicts a block diagram of a neural network system using a floating point unit according to one or more embodiments of the present invention.

FIG. 6 depicts a block diagram of a neural network system using a floating point unit according to one or more embodiments of the present invention. The neural network system 610 can implement an artificial neural network such as a DNN, a CNN, or any other machine learning algorithm that includes computing exponential function. In one or more examples, the neural network system 610 can include the floating point unit 300 as an integral part of one or more processors. Alternatively, or in addition, the neural network system 610 can include the floating point unit 300 as a coprocessor. It should be noted that although a single floating point unit 300 is depicted in FIG. 6, in one or more embodiments of the present invention, multiple floating point units 300 can be used in parallel by the neural network system 610.

The neural network system 610 sends one or more instructions to the floating point unit for performing corresponding mathematical operations on one or more floating point operands. One of the instructions can include computing an exponential of an input operand, which is in the floating point representation. In such a case, the floating point unit 300 uses the estimator module 365 and other modules as described herein to estimate the exponential result and provide the output to the neural network system 610.

Accordingly, one or more embodiments of the present invention provide techniques to calculate exponential function, hardware implementation thereof, and usage scenario in machine learning tasks. One or more embodiments of the present invention have comparable accuracy to existing solutions that use 16 bit precision, with at least ×7 times reduction in instruction number and latency. One or more embodiments of the present invention can be implemented with just two fully pipelined instructions that use hardware modules as described herein. The first instruction is a multiply with a constant. The second instruction is float-to-integer compute followed by a piecewise linear function computation (addition of 3 terms), where only a lookup is used to get a constant as one of the 3 terms.

The above operations, as described herein facilitate an improved exponential estimation. The improvement includes improvement in speed and compute resources used because the exponential function calculation uses only two fully pipelined instructions to (1) transform the input from base "e" to base 2 and scale by the power of 2 times; and (2) obtain the mantissa bit of the output via a piecewise linear function and 3-way add, and then combine it with the exponent bits to get the final results.

Further, the exponential function calculations are customized for machine learning jobs in various precisions and verified on hardware emulation platform.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source-code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing an exponential calculation, the computer-implemented method comprising:
    computing, using a floating point unit that comprises an estimator module circuit, the exponential calculation using only two fully-pipelined instructions that include:
        a first instruction for computing an intermediate value y' by multiplying an input operand that is received in floating point representation with a predetermined constant value; and
        a second instruction for computing an exponential result for the input operand by concurrently:
            converting the intermediate value y' to an integer representation z represented by v most significant bits (MSB), and w least significant bits (LSB);
            determining exponent bits of the exponential result based on the v MSB from the integer representation z; and
            determining mantissa bits of the exponential result according to a piecewise linear mapping function using a predetermined number of segments based on the w LSB from the integer representation z.

2. The computer-implemented method of claim 1, wherein the input operand is multiplied by a predetermined constant $2^m/\ln(2$, wherein m is a predetermined value.

3. The computer-implemented method of claim 2, wherein m is configured according to float-to-integer conversion precision of a processor that requested the exponential calculation.

4. The computer-implemented method of claim 1, wherein determining the mantissa bits comprises mapping the w least significant bits to $[2^{(w)}-1]$ using the piecewise linear mapping function.

5. The computer-implemented method of claim 4, wherein the piecewise linear mapping function is performed using a 3-way addition, and one operand in the 3-way addition is a shifted-version of the input operand.

6. The computer-implemented method of claim 4, wherein in response to the input operand being a negative value, the piecewise linear mapping function comprises only a 1's complement operation on a fractional part of the input operand.

7. The computer-implemented method of claim 4, wherein the 3-way addition further comprises adding a bias value.

8. A system comprising:
    a processor; and
    a floating point unit that is communicatively coupled to the processor, the floating point unit comprises an estimator module circuit that performs a method for fast exponential calculation using only two fully-pipelined instructions, the method comprising:
        computing an intermediate value y' by multiplying an input operand that is received in floating point representation with a predetermined constant value; and
        computing an exponential result for the input operand by concurrently:
            converting the intermediate value y' to an integer representation z represented by v most significant bits (MSB), and w least significant bits (LSB);
            determining exponent bits of the exponential result based on the v MSB from the integer representation z; and
            determining mantissa bits of the exponential result according to a piecewise linear mapping function using a predetermined number of segments based on the w LSB from the integer representation z.

9. The system of claim 8, wherein the input operand is multiplied by a predetermined constant $2^m/\ln(2$, wherein m is a predetermined value.

10. The system of claim 9, wherein m is configured according to float-to-integer conversion precision of the processor.

11. The system of claim 8, wherein determining the mantissa bits comprises mapping the w least significant bits to $[2^{(w)}-1]$ using the piecewise linear mapping function.

12. The system of claim 11, wherein the piecewise linear mapping function is performed using a 3-way addition, and one operand in the 3-way addition is a shifted-version of the input operand.

13. The system of claim 11, wherein, in response to the input operand being a negative value, the piecewise linear mapping function comprises only a 1's complement operation on a fractional part of the input operand.

14. The system of claim 13, wherein the 3-way addition further comprises adding a bias value, wherein the bias value is incremented for fraction rounding in response to a binade being crossed.

15. A system comprising:
a floating point unit configured to compute one or more mathematical operations in response to receipt of one or more requests from one or more processors, the one or more mathematical operations including an exponential function, wherein the exponential function is computed by executing only two fully-pipelined instructions comprising:
a first instruction for computing an intermediate value y' by multiplying an input operand that is received in floating point representation with a predetermined constant value; and
a second instruction for computing an exponential result for the input operand, the second instruction being a fused instruction using the intermediate value y', the fused instruction comprising:
converting the intermediate value y' to an integer representation z represented by v most significant bits (MSB), and w least significant bits (LSB);
determining exponent bits of the exponential result based on the v MSB from the integer representation z; and
determining mantissa bits of the exponential result according to a piecewise linear mapping function using a predetermined number of segments based on the w LSB from the integer representation z;
wherein, the floating point unit is further configured to return the exponential result in response to the one or more instructions to the floating point unit.

16. The system of claim 15, wherein the input operand is multiplied by a predetermined constant 2^m/ln(2, wherein m is a predetermined value.

17. The system of claim 15, wherein determining the mantissa bits comprises mapping w least significant bits to [2^(w)−1] using the piecewise linear mapping function.

18. The system of claim 17, wherein the piecewise linear mapping function is performed using a 3-way addition, and one operand in the 3-way addition is a shifted-version of the input operand.

19. The system of claim 17, wherein in response to the input operand being a negative value, the piecewise linear mapping function comprises only a 1's complement operation on a fractional part of the input operand.

20. The system of claim 17, wherein the 3-way addition further comprises adding a bias value.

* * * * *